Patented June 17, 1947

2,422,618

UNITED STATES PATENT OFFICE 2,422,618

VITAMIN B6 INTERMEDIATES

Stanton A. Harris, Westfield, N. J., assignor to Merck & Co., Inc., Rahway, N. J., a corporation of New Jersey No Drawing. Application July 28, 1944, Serial No. 547,103

18 Claims. (Cl. 260—296)

This application relates generally to a process for the preparation of novel chemical compounds; in a particular sense it is concerned with the preparation of intermediates useful in the synthesis of vitamin B6 (3-hydroxy-4,5-di(hydroxymethyl)-2-methylpyridine).

This application is a continuation-in-part of the co-pending applications by the same inventor, Serial No. 267,603 filed April 13, 1939, now forfeited, and Serial No. 423,771 filed December 20, 1941, now U. S. Patent No. 2,399,347, issued April 30, 1946, which is a division of Serial No. 301,733 filed October 28, 1939, now U. S. Patent 2,266,754, issued December 23, 1941.

The compounds forming the subject matter of the present invention are represented by the formula:

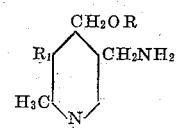

wherein R is alkyl, aryl, or aralkyl (i. e., benzyl and the like), and $R_1$ is amino, acylamino, or diacylamino; and salts thereof. According to the present invention, these compounds are obtained by reducing, preferably catalytically, a compound of the formula:

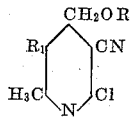

wherein R and $R_1$ are as above. It is presently preferred to carry out this reduction using for reaction media, lower aliphatic acids, with noble metals as catalysts. For example, the reduction can be effected using glacial acetic acid as reaction media and a mixture of platinum and palladium oxides as catalyst.

The following examples illustrate methods of practicing the present invention, but it is to be understood that these examples are given by way of illustration and not of limitation.

Example 1

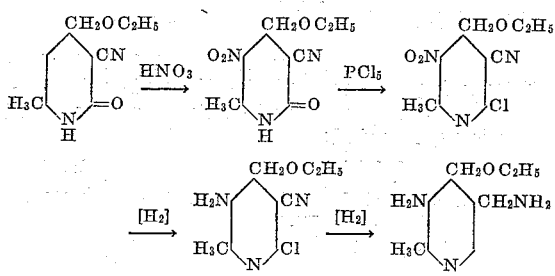

About 5 g. of 3-cyano-4-ethoxymethyl-6-methyl-2-pyridone (obtained by reacting ethoxyacetylacetone and cyano-acetamide) in 13 cc. of acetic anhydride is cooled and treated with 2.16 cc. of fuming nitric acid in 2 cc. of acetic anhydride, a little urea being added as a catalyst. The solid gradually dissolves with evolution of heat. The reaction mixture is maintained at a temperature below about 45° C. until the reaction is completed, as indicated by cessation of heat evolution. Upon pouring the mixture onto ice, crystallization of 3-cyano-4-ethoxymethyl-5-nitro-6-methyl-2-pyridone (M. P. 164–165° C.) takes place. The product is removed and purified by conventional operations.

About 60 g. of 3-cyano-4-ethoxymethyl-5-nitro-6-methyl-2-pyridone, 66 gms. of phosphorous pentachloride and 510 cc. of chlorobenzene are heated until solution is effected. The heating is continued until one half of the solvent is removed. The remaining solvent is removed under reduced pressure to yield a brown visous residue. This residue is treated with about 100 cc. of water and 20 cc. of ethanol. The mixture of residue and solvent is extracted with petroleum ether, and the extracts concentrated first at atmospheric pressure and finally under diminished pressure to obtain a residue containing 2-methyl-3-nitro-4-ethoxymethyl-5-cyano-6-chloropyridine (M. P. 47–48° C.). The product, thus obtained, is purified by conventional operations.

About 25.5 g. of 2-methyl-3-ntiro-4-ethoxymethyl-5-cyano-6-chloropyridine are dissolved in 300 cc. of ethanol and reduced with hydrogen using about 0.5 g. of platinum oxide as a catalyst. Reduction is stopped after absorption of approximately three moles of hydrogen per mole of substance reduced. After removing the catalyst, the solution is cooled causing crystallization of the product, 2-methyl-3-amino-4-ethoxymethyl-5-cyano-6-chloropyridine (M. P. 146–148° C.), which is removed by filtration.

A mixture of about 31 g. of 2-methyl-3-amino-4-ethoxymethyl-5-cyano-6-chloropyridine, 1400 cc. of glacial acetic acid, 11.3 g. of sodium acetate, 0.5 g. of platinum oxide, and 30 g. of charcoal containing approximately 5% of palladium is treated with hydrogen until about three mols have been absorbed. After filtration, the solution is concentrated under diminished pressure, and the residue so obtained is dissolved in water and filtered. To this solution is added 70 g. of picric acid dissolved in ethanol. The dipicrate of 2-methyl-3-amino-4-ethoxy-methyl-5-aminomethyl-pyridine (M. P. 186–187° C.) is formed and separates as a precipitate.

About 38.6 g. of the dipicrate of 2-methyl-3-amino-4-ethoxymethyl-5-aminomethyl pyridine is treated with 100 cc. of hydrochloric acid (1:1) and extracted first with nitrobenzene and then with ether. The acid solution is then concentrated under diminished pressure to a thick syrup. This syrup is dissolved in ethanol and acetone added causing crystallization of the dihydrochloride of 2-methyl-3-amino-4-ethoxymethyl-5-aminomethylpyridine (M. P. 195° C.) which is removed and purified by conventional procedure.

The free base, 2-methyl-3-amino-4-ethoxymethyl-5-aminomethylpyridine, can be obtained from the acid salts by known methods such as treatment with alkali, concentration to dryness, and extraction with an organic solvent.

*Example 2*

[Reaction scheme: 2-methyl-3-amino-4-ethoxymethyl-5-cyano-6-chloropyridine → (acetic anhydride) → diacetylamino intermediate → [H₂] → diacetylamino aminomethyl compound]

About 3.8 g. of 2-methyl-3-amino-4-ethoxymethyl-5-cyano-6-chloropyridine are refluxed with 20–25 cc. of acetic anhydride for about one half hour. The acetic anhydride is removed under diminished pressure and the residue containing 2-methyl-3-diacetylamino-4-ethoxymethyl-5-cyano-6-chloropyridine (M. P. 90–92° C.) is purified by conventional methods. This compound is readily hydrolyzed to the monoacetyl compound.

A mixture of about 3.09 g. of 2-methyl-3-diacetylamino - 4 - ethoxymethyl - 5 - cyano - 6 - chloropyridine, 100 cc. of glacial acetic acid, 0.82 g. of sodium acetate, 10 g. of 5% palladium charcoal catalyst, and 0.5 g. of Adams catalyst is treated with hydrogen until the theoretical quantity of hydrogen (3 mols) is absorbed. The mixture is filtered, concentrated to a syrup, dissolved in alcohol and filtered. To the filtrate is added 2.5 g. of picric acid in 10 cc. of ethanol to form the picrate of 2-methyl-3-diacetylamino-4-ethoxymethyl-5-aminomethylpyridine (M. P. 190–191° C.) which is removed by filtration and purified by recrystallization.

The picrate so obtained can be converted by conventional methods to the corresponding acid salts or to the free base, 2-methyl-3-diacetylamino-4-ethoxymethyl-5-aminomethylpyridine.

It will be understood by those versed in the art that compounds containing 4-benzyloxymethyl and 4-phenoxymethyl substituents can be similarly employed in these reactions to obtain homologs of the above mentioned compounds.

Modifications may be made in carrying out the present invention without departing from the spirit and scope thereof and we are to be limited only by the appended claims.

What is claimed is:

1. A compound of the formula:

[Structure: pyridine with CH₂OR, CH₂NH₂, R₁, H₃C substituents]

wherein R is selected from the class consisting of alkyl, aryl and aralkyl groups, and R₁ is selected from the class consisting of amino, acylamino and diacylamino groups; and salts thereof.

2. A compound of the formula:

[Structure: pyridine with CH₂OR, CH₂NH₂, R₁, H₃C]

wherein R is alkyl and R₁ is selected from the class consisting of amino, acylamino and diacylamino groups; and salts thereof.

3. A compound of the formula:

[Structure: pyridine with CH₂OC₂H₅, CH₂NH₂, H₂N, H₃C]

and salts thereof.

4. A compound of the formula:

[Structure: pyridine with CH₂OC₂H₅, CH₂NH₂, (CH₃CO)HN, H₃C]

and salts thereof.

5. A compound of the formula:

[Structure: pyridine with CH₂OC₂H₅, CH₂NH₂, (CH₃CO)₂N, H₃C]

and salts thereof.

6. The process that comprises catalytically hydrogenating a 2-methyl-5-cyano-6-chloropyridine having a 3-position substituent selected from the class consisting of amino, acylamino and diacylamino groups and a 4-position alkoxymethyl substituent, and that is represented

[Reaction scheme with R₁, CH₂OR, CN, Cl → [H₂]/catalyst → R₁, CH₂OR, CH₂NH₂]

wherein R is alkyl and R₁ is selected from the class consisting of amino, acylamino and diacylamino groups.

7. The process that comprises catalytically hydrogenating 2-methyl-3-amino-4-ethoxymethyl-5-cyano-6-chloropyridine and that is represented:

[Reaction scheme: H₂N, CH₂OC₂H₅, CN, Cl → [H₂]/catalyst → H₂N, CH₂OC₂H₅, CH₂NH₂]

8. The process that comprises catalytically hydrogenating 2-methyl-3-acetylamino-4-ethoxymethyl-5-cyano-6-chloropyridine and that is represented:

[Reaction scheme: CH₃CO-NH, CH₂OC₂H₅, CN, Cl → [H₂]/catalyst → CH₃CO-NH, CH₂OC₂H₅, CH₂NH₂]

9. The process that comprises catalytically hydrogenating 2 - methyl - 3 - diacetyl-amino- 4 - ethoxymethyl- 5 -cyano- 6 - chloropyridine and that is represented:

[Reaction scheme: (CH₃CO)₂-N, CH₂OC₂H₅, CN, Cl → [H₂]/catalyst → (CH₃CO)₂-N, CH₂OC₂H₅, CH₂NH₂]

10. In the synthesis of vitamin B₆, the step that comprises reducing, in the presence of a hydrogenation catalyst, a substance represented by the formula:

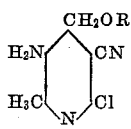

wherein R is a lower alkyl radical to produce a 3-amino - methyl-4-alkoxymethyl - 5 - amino - 6-methyl-pyridine.

11. In the synthesis of vitamin B6, the step that comprises reducing 2-methyl-3-amino-4-alkoxymethyl-5-cyano-6-chlor-pyridine to form a 2-methyl-3-amino-4-alkoxymethyl-5 - aminomethyl-pyridine.

12. 2- methyl-3-amino-4-alkoxymethyl-5-amino-methyl pyridine.

13. In the synthesis of vitamin B6, the step which comprises reducing 2-methyl-3-amino-4-ethoxymethyl-5-cyano-6-chloropyridine to form 2-methyl-3-amino - 4 - ethoxymethyl - 5-amino - methylpyridine.

14. 2-methyl-3-amino-4-ethoxymethyl-5-amino-methylpyridine.

15. In the synthesis of vitamin B6, the steps which comprise nitrating 3-cyano-4-ethoxymethyl-6-methyl-2-pyridone to form 3-cyano-4-ethoxymethyl-5-nitro-6-methyl-2-pyridone, halogenating the latter compound to form the 2-methyl-3-nitro-4-ethoxymethyl-5-cyano-6- chloropyridine, reducing the latter compound to form 2-methyl-3-amino-4-ethoxymethyl - 5 - cyano-6-chloropyridine, and reducing the latter compound to form 2-methyl-3-amino-4-ethoxymethyl-5-amino-methylpyridine.

16. In the synthesis of vitamin B6, the step which comprises hydrogenating 2-methyl-3-amino-4-ethoxymethyl-5-cyano-6-chloropyridine.

17. In the synthesis of vitamin B6, the step which comprises reacting 2-methyl-3-amino-4-ethoxymethyl-5-cyano-6-chloropyridine with hydrogen in the presence of a catalyst.

18. The process that comprises catalytically hydrogenating a 2-methyl-5-cyano-6-chloropyridine having a 3-position substituent of the class consisting of amino, acyl amino and diacylamino groups and a 4-position substituent of the class consisting of alkoxymethyl, aryloxymethyl and aralkoxymethyl groups and that it represented

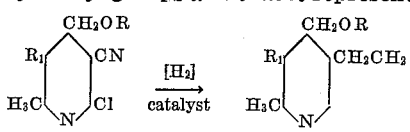

wherein R is selected from the class consisting of alkyl, aryl, and aralkyl groups, and R1 is selected from the class consisting of amino, acylamino and diacylamino groups.

STANTON A. HARRIS.